Patented July 6, 1926.

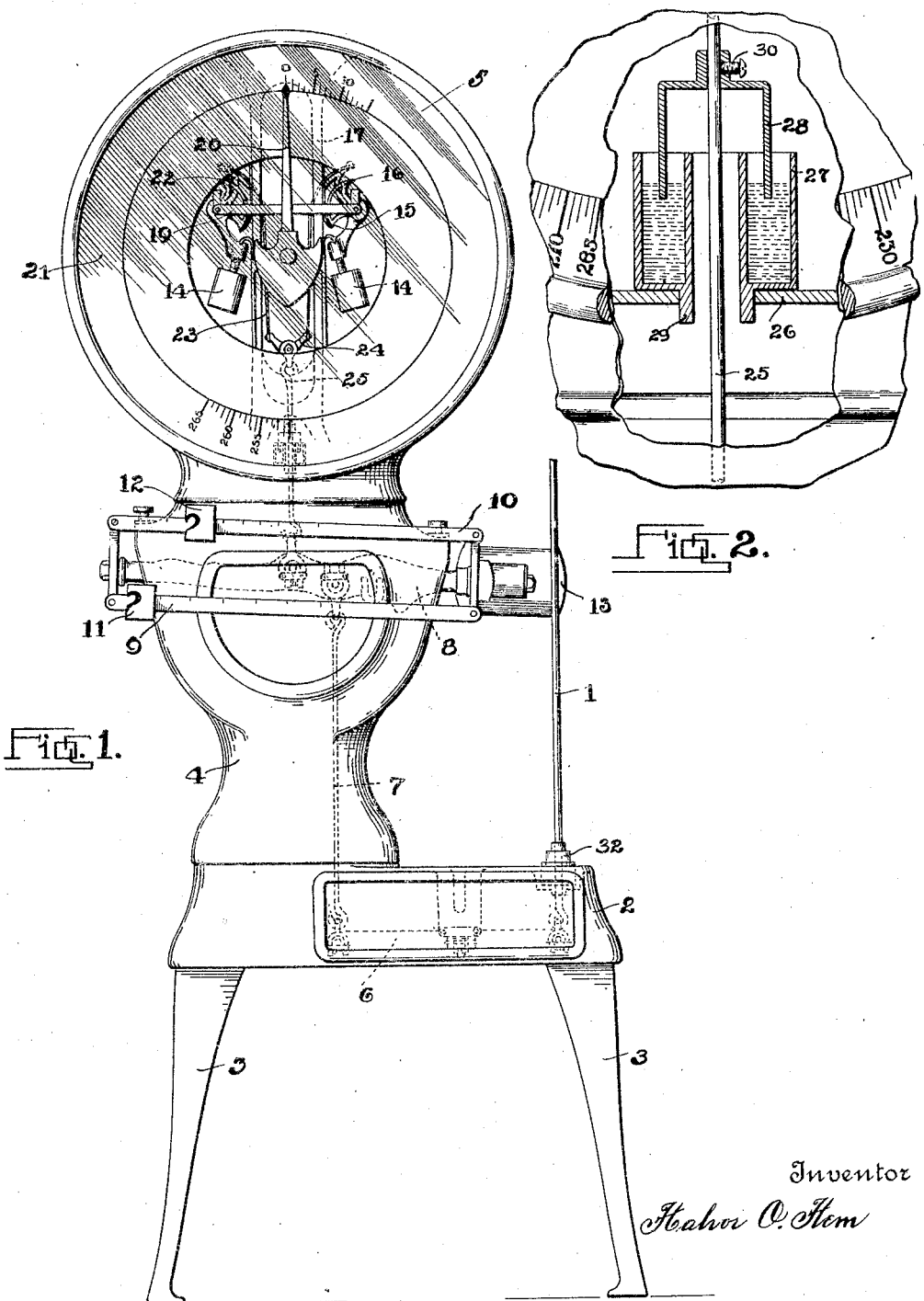

1,591,488

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

SEALING DEVICE.

Application filed June 3, 1920. Serial No. 386,168.

This invention relates to machine housings, and one of its principal objects is the provision of means for sealing openings in such housings through which movable machine parts pass and thereby to exclude dust, moisture, acid fumes, or other deleterious substances from the interior of the housing.

More specific objects are the provision of means for sealing openings in the housings of weighing scales through which movable parts of the weighing mechanism pass, and so constructing such sealing means that it will be absolutely frictionless in its operation and can therefore have no injurious effect upon the accuracy of the scale.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a front elevation of a scale embodying my invention; and

Figure 2 is an enlarged detail view, with parts broken away and parts shown in section.

Although I have shown my invention as incorporated in a particular type of weighing scale, it is to be understood that this embodiment is illustrative only, as the invention is also adapted for use not only in other types of weighing scales, but in its broad aspect in other classes of mechanical devices. The mechanism illustrated is of a type particularly adapted for use with overhead track scales, etc., having commodity-receivers connected to overhead levers.

In a scale of this type a tension rod 1 depends from the overhead lever mechanism (not shown) and passes through an opening in the upper side of the base portion 2 of the housing. The housing is supported upon legs 3 and consists of the said base portion 2, an upright portion or column 4, and a substantially watch-casing-shaped head 5. A lever 6 is fulcrumed inside the base portion 2 and one of its ends is connected to the tension rod, its opposite end being connected to a steelyard 7, the upper end of which is connected to a beam lever 8. The beam lever 8 is fulcrumed within the column 4 and projects from each side thereof. Graduated beams 9 and 10 are secured to the beam lever 8 and carry sliding poises 11 and 12, while a loading box 13 is carried at one end of the lever 8.

The load-offsetting mechanism of the scale consists of a pair of pendulums 14 supported within the head casing 5 by means of flexible metallic ribbons 15 which are secured at their lower ends to curved fulcrum sectors 16 on the pendulums and at their upper ends to vertical sector guides 17. The pendulums are connected by means of a compensating bar 19, which in turn is connected through suitable mechanism (not shown) to an indicator hand 20. The hand 20 is pivoted to swing over a dial 21, and the hand and dial, as well as the pendulum mechanism, are visible through the transparent face of the head casing 5. The pendulums are also provided with power sectors 22 from which depend flexible ribbons 23, the lower ends of said ribbons being connected by means of an equalizer bar 24 to a link 25, the lower end of which is connected to the beam lever 8. The load-offsetting mechanism so far described is of the type illustrated, described and claimed in U. S. Patent to Hapgood, No. 1,203,611, dated Nov. 7, 1916, and since my invention does not reside in the load-offsetting mechanism per se, it is unnecessary to set it forth in greater detail.

In a weighing operation when a load is placed upon the scale, an upward pull is exerted upon the tension rod 1, the lever 6 is rocked, and the steelyard 7 pulled downwardly, thereby rocking the lever 8 in its bearings and drawing downwardly upon the link 25 and ribbons 23. As the pendulums are rocked by the downward pull upon the ribbons 23, the fulcrum sectors 16 roll upwardly along the sector guides 17 and the pendulums swing outwardly and upwardly to positions in which the load on the scale is counterbalanced. This movement of the pendulums carries the compensating bar 19 vertically upward and the indicator hand is moved to a position on the chart in which the weight of the load is indicated.

The interior of the column 4 is separated from the interior of the head casing 5 by a wall 26 having a small opening therein through which the link 25 passes. There are no other openings in the casing, but there must be sufficient space around the rod so that there is no liability of its rubbing against the sides of the opening. If, therefore, no means is employed to seal this opening, it affords a port of access for dust, moisture or corrosive fumes likely to injure the sensitive weighing mechanism. I have applied the sealing device of my invention to this opening by mounting an annular receptacle 27 upon the upper face of the wall 26 surrounding the opening and a bell-shaped shield 28 upon the link 25. The receptacle 27 is held in place by means of a depending flange 29 which fits within the opening, and the bell-shaped shield is held in place by means of a set screw 30. The receptacle is partly filled with oil or other non-volatile substance, as indicated in Figure 2, and the bell-shaped shield 28 is so positioned on the link 25 that its lower edge is immersed in the oil. The opening is thereby closed. As the link 25 is moved downwardly during a weighing operation the edge of the bell-shaped shield 28 is dipped deeper into the oil, the receptacle being of sufficient depth to allow weighing movements of the link 25 without any interference.

It is obvious that the seal may also be applied to a member having rotary instead of reciprocatory movement, and that the receptacle may, with slight modifications, be placed above or below the opening or attached to the link instead of to the wall. Such seals may be employed at other openings in the housing walls. I have shown one, for example, at 32, where the tension rod 1 enters the base portion 2.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:—

1. In a weighing scale, in combination, a housing, automatic load-counterbalancing mechanism within said housing, said housing having an opening therein and being otherwise substantially closed, rectilinearly movable connecting means connected to said automatic load-counterbalancing mechanism and extending through said opening for connection to a commodity-receiver, and a fluid sealing device for said opening.

2. In a weighing scale, in combination, a housing, automatic load-counterbalancing mechanism within said housing, said housing having an opening therein and being otherwise substantially closed, rectilinearly movable connecting means connected to said automatic load-counterbalancing mechanism and extending through said opening for connection to a commodity-receiver, a fluid sealing device for said opening, said sealing device including a receptacle supported by said housing and adapted to contain a fluid, and an inverted cup-shaped shield secured to said rectilinearly movable connecting means and adapted to have its edge immersed in such fluid.

HALVOR O. HEM.